3,517,032

TRIOXIDES

Nicholas A. Milas, Belmont, and Grigorios G. Arzoumanidis, Cambridge, Mass., assignors to Massachusetts Institute of Technology, Cambridge, Mass., a corporation of Massachusetts
No Drawing. Filed Dec. 9, 1965, Ser. No. 512,799
Int. Cl. C07c *73/00;* C07d *19/00*
U.S. Cl. 260—338      4 Claims

ABSTRACT OF THE DISCLOSURE

Organic trioxides may be prepared by dehydrating an organic hydroperoxide, such as by reacting the hydroperoxide with triphenyl phosphine dichloride in the presence of triphenyl phosphine oxide. The compounds are characterized by a trioxy group having the structure O—O—O— in which an oxide atom is connected to a carbon atom of an organic group which may be terminal groups such as di-tert-butyl-oxide or di-lauroyl-trioxide or a cylical structure such as 4-4-7-7 tetramethyl-1,2,3-trioxa-cycloheptane. The organic trioxides are useful as catalysts for the polymerization of unsaturated monomers such as vinyl esters and halides.

---

This invention resides in a new class of chemical compounds which may be designated as organic trioxides.

In general these compounds have the structure

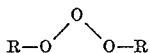

in which R designates an alkyl, aralkyl or acyl group, or both R groups may be connected to constitute a chain of 3–7 carbon atoms forming cyclical trioxides having 6–10 member rings.

The organic trioxides of this invention are characterized by a trioxy chain having the equivalent oxidizability of two active oxygen atoms, with both end oxygen atoms attached to a carbon atom of an organic group. They are potent oxidizing agents and are also useful as catalysts for the polymerization of unsaturated monomers such as vinyl esters and halides. The organic trioxides also react with unsaturated compounds to form new peroxides of high stability which themselves are useful as cross linking catalysts in the manufacture of polyethylenes and polypropylenes. Surprisingly, these compounds are stable at room temperature, and are accordingly distinguished from the molozonides which exist only at about −80° C.

In general the organic trioxides are prepared by the elimination of a molecule of water from two molecules of a hydroperoxide (ROOH) or from two hydroperoxy groups attached to the same molecule. This class of hydroperoxides is already well known (see Milas, Peroxides and Peroxy Compounds, vol. 10 Encyclopedia of Chemical Technology. The Interscience Encyclopedia Inc. N.Y. 1953; A. G. Davies, Organic Peroxides, Butterworth Ltd. London 1961; E. G. E. Hawkins, Organic Peroxides, E. and F. E. Spon Ltd. London 1961). Dehydration may be accomplished by a solvolysis reaction between the hydroperoxide and a dihalide such as triphenyl phosphine dichoride, in which the hydrogen halide is removed as rapidly as it is formed and the resulting di-alkyl peroxide decomposes spontaneously into the trioxide and triphenyl phosphine oxide. The trioxide may be distilled from the reaction mixture.

The following examples have been selected for purposes of illustration to set forth representative embodiments of this invention as applied to the several categories of organic compounds mentioned above. The principles herein set forth are, however, deemed applicable to the entire class of organic hydroperoxides, many members of which are given in the aforementioned publication.

EXAMPLE I

Di-tert-Butyl Trioxide.—Di-t-butyl trioxide was produced in small yields by allowing triphenyl phosphine dichloride (usually prepared from triphenyl phosphine and gaseous chlorine in carbon tetrachloride, and isolated as a yellow solid which was shown by analysis to have the formula $(C_6H_5)_3PCl_2 \cdot CCl_4$) to react with pure t-butyl hydroperoxide under a variety of conditions including solvolysis. However, best results were obtained when triphenyl phosphine oxide (8.8 g., 0.032 mole) was suspended in 150 ml. of dry n-pentane and to the mixture added with rapid stirring t-butyl hydroperoxide (7.25 g., 0.0108 mole). The mixture was then stirred at room temperature for about one hour, then cooled to −78° in an atmosphere of dry nitrogen and to it added slowly triphenyl phosphine dichloride (19.2 g., 0.038 mole). Stirring was continued overnight while the mixture warmed up to room temperature. The pentane layer was then separated, washed three times with 5% potassium hydroxide solution, dried over magnesium sulfate and filtered. The pentane was removed by distillation and the residue fractionated under reduced pressure and the fraction boiling at 40° (0.7 mm.) collected and analyzed; yield, 55%; M.P. +5°. This trioxide has a characteristic pleasant odor and at 50° it gives a single peak on the vapor phase chromatograph which appears at 22 with sensitivity 8.

Analysis.—Calc'd for $C_8H_{18}O_3$ (percent): C, 59.22; H, 11.18; O, 19.73; m. wt. 162.22. Found (percent): C, 59.16; H, 10.98; O, by the $(C_6H_5)_3P$ method, 19.34; m. wt. 165.5; 175 (in exaltone).

The mechanism of the reaction is not completely understood at present, but there are indications that it may proceed as follows:

$(C_6H_5)_3PCl_2 + (CH_3)_3COOH + (C_6H_5)_3PO \longrightarrow$

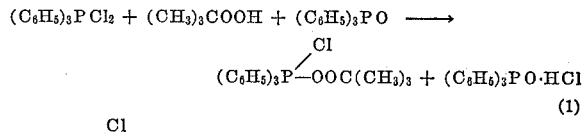

(1)

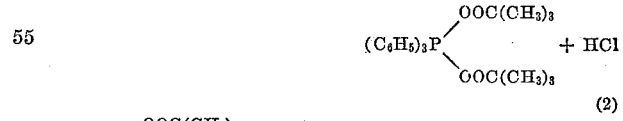

(2)

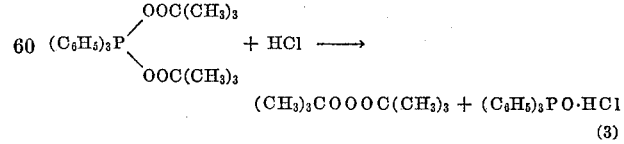

$(CH_3)_3COOOC(CH_3)_3 + (C_6H_5)_3PO \cdot HCl$ (3)

The molecular refraction of the trioxide was also determined from the refractive index, $n_D^{27°}$ 1.4052 and the density, $d_4^{27°}$ 0.8901, and found to be 44.64. This agrees very well with the calculated value of 45.12 for two active oxygen atoms. The trioxide has a finite dipole moment, 0.28D, when measured in n-hexane by the heterodyn-beat method.

The I.R. and Raman spectra of the trioxide have also been measured and are given in Table I.

TABLE I.—INFRARED AND RAMAN SPECTRA OF LIQUID DI-t-BUTYL TRIOXIDE

Infrared bands, cm.$^{-1}$*:
 760 (w.), 812 (v.w.), 862 (s.), 894 (v.w.), 928 (v.w.), 948 (w.), 1034 (w.), 1172 (v.s.), 1204 (s.), 1248 (m.s.), 1370 (s.), 1378 (m.), 1388 (w.), 1450 (w.), 1475 (w.), 1480 (m.), 2870 (w.), 2938 (m.), 2942 (m.), 2980 (s.).

Raman bands, cm.$^{-1}$*:
 250 (w.), 285 (m.), 513 (w.), 528 (w.), 585 (w.), 758 (m.), 811 (m.), 864 (v.s.), 887 (s.), 912 (w.r.), 940 (w.), 1200 (w.), 1245 (w.), 1275 (m.), 1449 (v.s.), 2710 (w.), 2930 (v.s), 2945 (v.s.), 2976 (v.s.).

*V.s.=very strong, s.=strong, m.=medium, w.=weak, v.w.=very weak, r.=shoulder.

On the basis of our present knowledge including the NMR spectrum of di-t-butyl trioxide, the most reasonable structure which may be suggested is that represented by the resonating triangular structures of Equation 4.

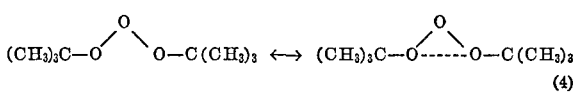

(4)

Di-t-butyl trioxide is prone to rearrangement in polar solvents, and even during its preparation, it is formed together with a rearranged peroxide which was separated by fractional crystallization at low temperatures; M.P. —26°, and analyzed as follows:

*Analysis.*—Calc'd for $C_8H_{18}O_3$ (percent): C, 59.22; H, 11.18; O, 9.9; m. wt., 162.2. Found (percent): C, 59.22; H, 11.29; O, 10.2; m. wt. (cryoscopic in benzene), 156.4.

A VPC of this peroxide with a sensitivity of 8 showed a single strong peak at 99.5. An I.R. spectrum showed the following characteristic bands in cm.$^{-1}$: 2985 (v.s.); 2945 (m.); 2930 (w.); 2835 (w.); 1478 (w.); 1455 (w.); 1378 (m.); 1370 (v.s.); 1250 (m.); 1208 (s.); 1168 (v.s.); 1080 (s.); 892 (w.); 870 (m.); 859 (s.); 779 (v.w.); 760 (w.). An NMR spectrum of the pure peroxide using tetramethyl silane as internal standard showed two peaks between 1.15 and 1.55 p.p.m. attributed to protons of the methyl groups and one at 3.18 p.p.m. due to the protons of the methoxy group.

Apparently, di-t-butyl trioxide (Eq. 3) is formed from the combination of t-butoxy cation and t-perbutoxy anion which are formed from the reaction of hydrogen chloride with di-t-butyl peroxy triphenyl phosphonium compound the formation of the triphenyl phosphine oxide hydrochloride producing:

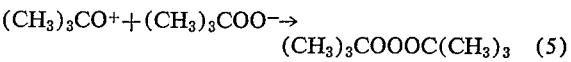

(5)

However, the t-butoxy cation is much more unstable than the t-perbutoxy anion so that some of the former possibly rearranges rapidly to 2-methoxy isopropyl carbonium ion to form the new peroxide shown in Equation 6.

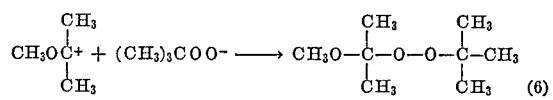

(6)

EXAMPLE II 4,4,7,7-tetramethyl - 1,2,3 - trioxyacycloeptane.—This cyclic trioxide has been prepared by two methods. Best results were obtained by the solvolysis method described in our U.S. patent application Ser. No. 337,757, filed Jan. 15, 1964.

Method I.—Solvolysis

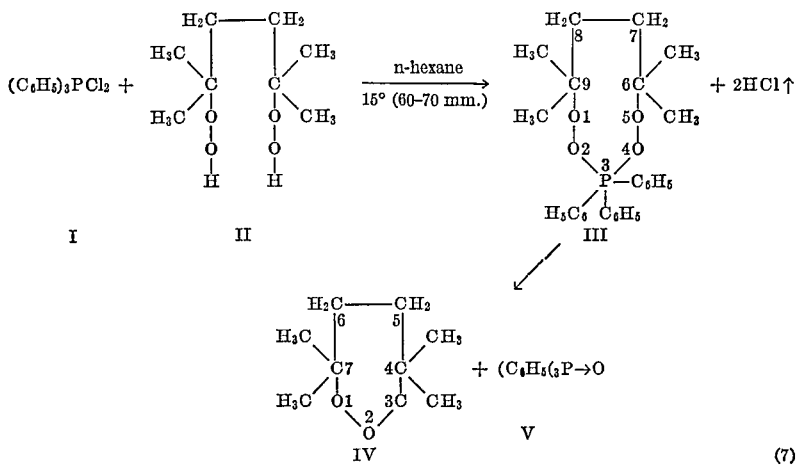

(7)

To a suspension of 12.3 g. of 2,5-dimethyl-2,5-dihydroperoxyhexane (M.P. 104–105°) in 200 ml. of n-hexane was added at 15° with magnetic stirring 33.3 g. of triphenyl phosphine dichloride complex and the flask was immediately attached to a condenser cooler to —78° which was connected to a vacuum (60–70 mm.) line. The reaction was complete in four hours. The reaction mixture was then filtered and the hexane removed from the filtrate at room temperature under reduced pressure (60–70 mm.) using a 30-inch fractionating column. The residue (9.69 g.) was fractionated under reduced pressure (0.3 mm.) and the fraction 2.8 g. boiling at 29–40° was collected and showed by I.R. to be a mixture of the trioxide and its rearranged product. The trioxide was isolated as a second fraction (5.3 g.) obtained at 40–41° which crystallized on standing into long needles, M.P. 40°. An I.R. spectrum taken of these crystals showed the following bands in cm.$^{-1}$: 2990 (v.s.), 2955 (s.), 2940 (s.), 2890 (r.m.), 2860 (r.m.), 1478 (m.s.), 1454 (m.s.), 1394 (s.), 1377 (v.s.), 1324 (m.), 1253 (s.), 1229 (s.), 1208 (v.s.), 1160 (v.s.), 1123 (s.), 1008 (w.), 992 (v.w.), 951 (m.), 936 (w.), 896 (s.), 837 (v.w.), 809 (m.), 758 (w.), 750 r.w.), 607 (w.), 567 (w.), 540 (v.w.).

*Analysis.*—Cal'd for $C_8H_{16}O_3$ (percent): C, 59.97; H, 10.06; 2 O, 19.97; m. wt. 160.2. Found (percent): C, 59.73; H, 10.06; 2 O, 17.84; m. wt., 164.7, 163.4 (exaltone).

The low boiling fraction separated from the cyclic trioxide was refractionated using a micro-fractionating column and the product boiling at 33° (3.8 mm.) collected and found to be homogeneous; M.P. −29°; $n_D^{20}$, 1.4282; $n_D^{27°}$, 1.4258; $d_4°^{27°}$, 0.9721; $M_R$, calc'd (percent): 42.43; found (percent), 42.16.

*Analysis.*—Calc'd for $C_8H_{16}O_3$ (precent): C, 59.97; H, 10.06; O, 9.97. Found (percent): C, 59.37; H, 10.05; O, 9.35 (HI method).

The molecular weight was also determined by the cryoscopic method in benzene. Calc'd for $C_8H_{16}O_3$ (percent): 160.2. Found (percent): 158.9; 161.0.

This was identified as a rearranged peroxide having an infra-red spectrum showing the following bands in cm.$^{-1}$; 2995 (v.s); 2953 (v.s.); 2925 (r.m.); 2891 (m.); 2845 (w.); 2745 (v.w.); 1470 (r.w.); 1458 (m.); 1420 (r.w.); 1378 (s.); 1472 (v.s.); 1289 (m.); 1254 (s.); 1242 (v.s.); 1218 (v.s.); 1159 (s.); 1119 (v.w.); 1087 (v.s.); 1049 (m.); 995 (w.); 968 (w.); 935 (v.w.); 924 (r.v.w.); 890 (m.); 875 (m.); 856 (m); 843 (m.); 824 (w.); 786 (v.w.); 764 (w.); 757 (r.v.w.); 729 (w.); 637 (w.)

Although the IR of the above rearranged trioxide (peroxide) shows, in addition to a peroxy group, the presence of an ether linkage, it does not differentiate between structures VI and VII and degradative studies had to be made to settle this point. Upon reduction with sodium bisulfite, VI and VII should form a different ketone.

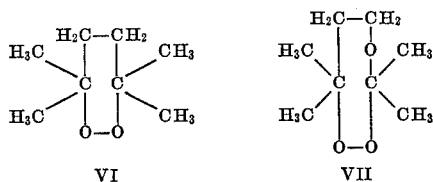

VI          VII

So that, when 0.08 g. of the rearranged peroxide was dissolved in about 8 ml. of ethyl alcohol and the solution heated on a steambath with excess sodium bisulfite solution, followed by the addition of 2,4-dinitrophenyl hydrazine reagent, a precipate was obtained which after recrystallization (0.065 g.) had a M.P. of 123° and the following combustion analysis:

*Analysis.*—Calc'd (acetone–2–4–DNP) (percent): N, 23.62. Found (percent): N, 23.79. This analysis together with the other properties mentioned above showed definitely that the rearranged peroxide has structure VII rather than VI.

EXAMPLE III

The use of triphenyl phosphine dichloride with triphenyl phosphine oxide to produce the cyclic trioxide IV After several preliminary trials, the following experimental procedure seemed to give the best results. To 200 ml. of dry pentane at 0° was added 20.25 g. of triphenyl phosphine dichloride complex and 2.7 g. of triphenyl phosphine oxide. The mixture was stirred with a mechanical stirrer in an atmosphere of dry nitrogen for ½ hr., then to it was added in the course of ½ hr. 7.63 g. of 2,5-dimethyl - 2,5 - dihydroperoxyhexane (M.P. 103°). The pentane layer was then separated, washed once with water, then twice with 5% potassium hydroxide solution, dried over magnesium sulfate and filtered. The filtrate was subjected to a vacuum distillation at room temperature to remove the pentane and carbon tetrachloride, and the viscous residue fractionated and the fraction boiling at 47° (0.35 mm.) collected; yield of the crude product, 5.4 g. An I.R. spectrum of this product showed the presence of very low intensity carbonyl and hydroxyl bands, so it was redissolved in dry pentane and recrystallized at low temperature; M.P. 40°. The analytical data including the I.R. spectrum of this trioxide were identical with those obtained by the solvolysis method. The yield of the cyclic trioxide was not as good as that obtained by the solvolysis method.

EXAMPLE IV

Di-lauroyl trioxide

Di-lauroyl trioxide was prepared by allowing pre-lauric acid to react at low temperatures with triphenyl phosphine dichloride in the presence of triphenyl phosphine oxide.

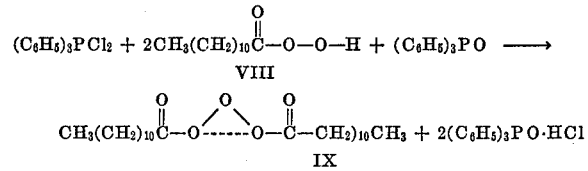

To a suspension of 2.65 g. of triphenyl phosphine oxide and 5.4 g. of per-lauric acid in 200 ml. of dry pentane cooled to −78° with stirring in an atmosphere of nitrogen was added slowly 5.8 g. of triphenyl phosphine dichloride complex. Stirring was continued overnight while the mixture warmed up to room temperature. The pentane layer was separated and the solvent removed under reduced pressure. An I.R. spectrum of the amorphous solid residue showed the absence of per-lauric acid. The residue was recrystallized from pentane at −10° and the crystals collected and analyzed, M.P. 42°.

*Analysis.*—Calc'd for $C_{24}H_{46}O_5$ (percent): C, 69.52; H, 11.18. Found (percent): C, 70.34; H, 11.53.

This trioxide liberates copious iodine from an acidified potassium iodine solution. Our preliminary analytical and spectroscopic findings seem to be consistent with structure IX.

Although this invention has been described in detail with reference to representative types of organic compounds, it is contemplated that those skilled in the art and familiar with the principles herein disclosed will readily apply this invention to other known hydroperoxides and peroxyacids and produce additional organic peroxides within the scope of this invention. For instance, it has been found that cumene hydroperoxide

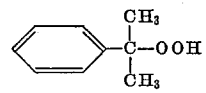

may be utilized in the method of Example I in place of t-butyl hydroperoxide.

Having thus disclosed our invention and described in detail preferred and representative embodiments thereof, we claim and desire to secure by Letter Patent:

1. An organic trioxide selected from the group consisting of compounds represented by the formula:

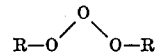

wherein each R group taken separately is t-butyl, or lauroyl or the two R groups taken together represent the connecting structure:

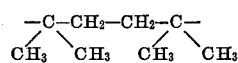

2. An organic trioxide as defined as by claim 1 in which the said groups are t-butyl, said compound being di-t-butyl-trioxide.

3. An organic trioxide as defined by claim 1 in which the organic groups are lauroyl, said compound being di-lauroyl trioxide.

4. An organic trioxide as defined by claim 1 in which the said organic group is

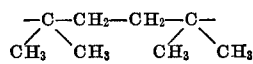

said compound being 4,4,7,7 - tetramethyl - 1,2,3-trioxacycloheptane.

References Cited

UNITED STATES PATENTS 2,298,405  10/1942  Milas _____ 260—610

FOREIGN PATENTS 896,813  5/1962  Great Britain.

OTHER REFERENCES

J.A.C.S., 53, pp. 221–224 (1931), ". . . Auto-Oxidation of Certain Ethers," by N. A. Milas.

HENRY R. JILES, Primary Examiner

S. D. WINTERS, Assistant Examiner

U.S. Cl. X.R.

260—89.3, 92.8, 339, 405, 610